3,026,282
Patented Mar. 20, 1962

3,026,282
DIMETHYL SILICONE ELASTOMERS CROSS-LINKED THROUGH CYANO GROUPS AND PROCESS THEREFOR
Roscoe A. Pike, Grand Island, N.Y., assignor to Union Carbide Corporation, a corporation of New York
No Drawing. Filed Apr. 2, 1957, Ser. No. 650,097
9 Claims. (Cl. 260—37)

This invention relates, in general, to new compositions of matter in the form of silicone elastomers, and to a new and improved process for the production of such compositions. More particularly, the invention contemplates the provision of unique silicone elastomer compositions which are characterized by crosslinkages effected through cyano substituents of cyanoalkylsiloxy groups in the form of dinitrile or secondary nitrile linkages, and the provision of a new process for the production of elastomer compositions of the general class described.

On the basis of available literature reports, it would appear that the curing of silicone elastomers containing cyanoalkyl groups by the coupling of two such cyanoalkyl groups to give a dinitrile, or by coupling of a cyanoalkyl group with a methyl group attached to silicon, for example, to give a secondary nitrile, constitutes a new type of curing mechanism which has not been reported heretofore.

In copending application Serial No. 650,089, of D. L. Bailey, R. A. Pike and W. T. Black filed of even date with this application and assigned to the same assignee (now abandoned), there are described and claimed, among others, the unique group of linear, high-molecular weight, heat-curable cyanoalkylsiloxy polymers or gum stocks as represented by the following unit structural formula:

(I) $—[NC(CH_2)_aSiRO]_x \cdot [R'_2SiO]_y—$ wherein $x$ and $y$ represent the weight-percentages of the respective components within the combined siloxane system, with $x$ varying from 0.1 to 2.0 and the sum of $x+y$ being equal to 100; $a$ has a value from 2 to 5, inclusive; R represents a saturated monovalent hydrocarbon radical, including alkyl and aryl radicals and substituted alkyl and aryl radicals; and R' represents at least one saturated monovalent hydrocarbon radical selected from the group consisting of alkyl, aryl, alkaryl and aralkyl radicals.

The aforementioned copending application further describes the production of improved silicone elastomer compositions resulting from compounding and curing of such cyanoalkylsiloxy polymers or gum stocks, among others, to develop conventionally crosslinked structures, i.e., crosslinking of the type, Si-hydrocarbon-Si.

The present invention is based, in part, on my discovery that the cyanoalkylsiloxy polymers of the class defined above can be compounded and cured in the presence of certain peroxide catalysts to effect coupling of the cyanoalkylsiloxy groups by crosslinks of the types (a) Si-dinitrile-Si or (b) Si-secondary nitrile-Si, as represented by the following unit structural formulae depicting typical dimethyl silicone elastomers crosslinked through cyanoalkyl substituents:

a) 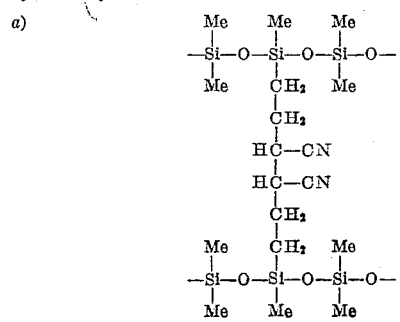

or
(b) 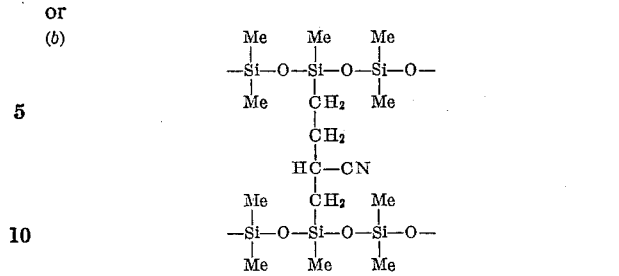

In essence, I have found that dimethylsilicone gums, for example, containing cyanoalkylsiloxy units in concentrations within the range 0.1 to 2.0 percent by weight, can be compounded with conventional filler materials and cured by means of peroxide catalysts, such as di-cumyl peroxide and similar non-volatile dialkyl and aryl-substituted dialkyl peroxides, to yield novel silicone compositions crosslinked to form elastomer structures through their cyano groups in the manner illustrated by the foregoing formulae. While the novel linear, high molecular weight cyanoalkylsiloxy polymers and copolymers of the aforementioned copending application Serial No. 650,089 may be produced with virtually any desired concentration of cyanoalkyl groups, for purposes of the present invention it is found that concentrations in excess of approximately 2.0 percent by weight yield unsatisfactory products due to excessive crosslinking. In actual practice, I prefer to employ a cyanoalkylsiloxy content within the range of approximately 0.25 to 0.75 percent by weight, but satisfactory products are obtained with all concentrations within the range 0.1 to 2.0 percent by weight.

It is believed that the unique curing mechanism of the invention proceeds as illustrated within the following skeletal equations representing the reaction of gamma-cyanopropyl groups:

(a) 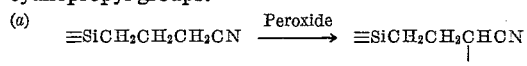

(b) 

or
(c) 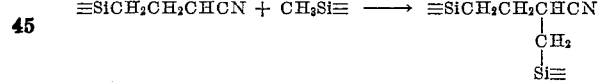

As will be readily apparent from the foregoing equations, the hydrogens in alpha position with respect to a nitrile group are active and will react with some peroxides. The curing mechanism potential in such a reaction provides an excellent means for introducing cross-linking sites into modified dimethylsilicone gums to yield elastomer compositions similar to those obtained by use of a vinyl-type cure. Accordingly, the compositions and process of the invention are particularly useful for purposes of providing predetermined small quantities of controllably-reactive crosslinking media within silicone elastomer compositions in general.

The curing of cyano-modified linear silicone gum stocks of the specific type defined within formula I, by coupling through one or two nitrile groups in the manner illustrated hereinbefore, is generally effected by compounding the gum stock with filler and curing the resulting compound with di-cumyl peroxide, or an equivalent non-volatile peroxide, at a temperature within the range 150–190° C. for periods ranging from five (5) minutes to an hour, followed by suitable postcuring at temperatures within the range 150–250° C. for periods up to twenty-four (24) hours. For example, a dimethyl silicone gum stock containing 0.1 to 2.0 percent by weight of gamma-cyanopropylmethyl-siloxy groups may be compounded with silica filler and zinc or ferric oxide, or both, on a standard rubber mill employing a total of forty (40) parts of filler per one hundred (100) parts of gum, with two to five (2–5) parts of the filler consisting of the metal oxides, and mold-cured at 150° C. for twenty minutes followed by postcuring for twenty-four (24) hours at 250° C. to yield a satisfactory elastomer. In this connection, it is found that when di-cumyl peroxide is employed as the curing catalyst, a neutral or basic filler must be used. Since the silica fillers are acid in nature, it is necessary to admix the basic metal oxides with the silica in order to obtain good curing action. On the other hand, provided a basic carbon black filler is used, no oxide need be added to obtain good cures. Other non-volatile dialkyl and aryl-substituted dialkyl peroxides would demonstrate similar curing properties with respect to the nature of the filler material employed. In general, it is found that the elastomers containing ferric oxide are more heat stable than those containing zinc oxide, but both oxides provide elastomers of good physical properties.

It is interesting to note, that when di-tertiary-butyl peroxide, which is a preferred catalyst for curing vinyl-modified dimethyl silicone gum systems, is employed as catalyst within the gum systems of the present invention, a partial cure, only, is obtained. It is presumed that the coupling of nitrile groups according to the curing mechanism of the invention involves a slower reaction than that obtained in the vinyl-type cure, and this more volatile dialkyl peroxide is apparently lost before a complete reaction can take place. It is interesting to note, also, that a pure dimethyl silicone gum catalyzed with di-cumyl peroxide will not cure under conditions analogous to those employed in effecting cures according to the unique curing mechanism of the invention.

In some instances, we find it to be advantageous to subject an elastomer gum stock, after incorporation of the filler in the gum but before addition of the curing agent or catalyst, to room temperature or "bin aging" for a period of from one day to a week. Alternatively, the filled but uncatalyzed gum stock can be precured by heating at an elevated temperature within the range 250–300° F. for a period of from one to two hours. It is found that both types of precure aging provides opportunities for better wetting of fillers by the gums, and the latter method also provides for elimination of objectionable volatile matter such as water and adsorbed gases carried into the gum stocks by the fillers. Precure heat-aging is not essential to the curing mechanism of the invention but it may be practiced with particular advantage in treating filled gum stocks which are to be employed in the production of thick-section elastomers. Thus, precure heat-aging permits the elimination of volatile matters at a stage when distortion resulting from gas elimination is not harmful, and reduces the amount of gas that must be eliminated in the postcure treatment, with consequent reduction in the amount that must be eliminated at the critical stage when density and structural form must be maintained.

We may employ the curing agents or catalysts in any suitable amounts and proportions with respect to the relative content of cyanoalkylsiloxy units, but we prefer to employ the catalysts in at least stoichiometric or chemically equivalent amounts plus, when necessary or desirable, a slight excess sufficient to compensate for any volatilization of the curing agent that may occur during curing.

Preferably, at the conclusion of any precure aging or precure heat-aging, the stock is re-plasticized, as by milling, the catalyst is added to provide a curable compound, and, thereafter, the compound is mold-cured in the manner explained above, followed by postcuring at temperatures within the range 150–250° C. for periods up to twenty-four hours in any suitable apparatus, such, for example, as a forced-draft oven.

As will be readily apparent, in lieu of the linear copolymeric cyanoalkyl-modified gum stocks of the type defined in formula I above, the starting materials for the elastomers of the invention can be prepared by simply blending two or more polymers to achieve the effect of utilizing a linear polysiloxane system having cyanoalkylsiloxy and $R'_2SiO$ groups present therein. Alternatively, a copolymeric cyano-modified gum stock may be blended with a pure dimethyl gum, for example, to yield improved elastomer compositions upon ultimate curing in accordance with the process of the invention.

It is believed that the invention may be best understood by reference to the following tabulated examples showing the preparation of typical elastomers in accordance with the foregoing principles and procedures:

EXAMPLES

*Dimethyl Elastomers Containing 0.5 Wt.-Percent [NC(CH$_2$)$_3$SiMeO] Cured With Dicumyl Peroxide* [a]

| | 0.5 wt.-percent [NC(CH$_2$)$_3$SiMeO]–99.5 wt.-percent (Me$_2$SiO) | | | | 100% (Me$_2$SiO) |
|---|---|---|---|---|---|
| Example No. | I | II | III [b] | IV [b] | V [c] |
| Filler (percent) | 40 pt. Hi-Sil-X303 [e] | 40 pt. Santocel CS [e] | 40 pt. Santocel CS [e] | 40 pt. Hi-Sil-X303 [e] | 40 pt. Santocel CS [e] |
| Fe$_2$O$_3$ | 0 | 1 | 2 | 2 | 2 |
| ZnO (percent) | 5 | 4 | 0 | 0 | 0 |
| Di-cumyl peroxide (percent) | 2 | 3 | 3 | 3 | 3 |
| MOLD CURED AT 150° C.—20 MIN. | | | | | |
| Hardness (Shore A) | 40 | 22 | 30 | 25 | |
| Percent Elongation | 570 | 780 | 550 | 550 | No cure obtained. |
| Tensile (p.s.i.) | 779 | 460 | 873 | 947 | |
| Tear (lb./in.) | 182 | 106 | 110 | 195 | |
| Set | 10 | 20 | 0 | 0 | |
| POSTCURE 480° F.—24 HR. | | | | | |
| Hardness (Shore A) | [d] 54 | 52 | 50 | 52 | |
| Percent Elongation | 250 | 225 | 180 | 150 | No cure obtained. |
| Tensile (p.s.i.) | 480 | 427 | 702 | 519 | |
| Tear (lb./in.) | 67 | 62 | 41 | 39 | |
| Set | 0 | 0 | 0 | 0 | |

[a] Crystalline di-cumyl peroxide dissolved in acetone or diethyl ether was added to sheet on mill. If mill is above 65° C. di-cumyl peroxide can be added as a solid.
[b] Bin aged 2.5 weeks.
[c] Contains no [NC(CH$_2$)$_3$SiMeO].
[d] Postcure values for 150° C. for 6 hr. This sample could not be tested after 4 hr. at 480° F.
[e] HiSil X303 and Santocel CS=silica fillers.

It can be concluded from the foregoing tabulated data that silicone elastomer with physical properties similar to those obtained by conventional curing systems can be obtained by the coupling of cyanoalkyl groups using select peroxide catalysts of the general class defined.

Having thus described the subject matter of the invention what it is desired to secure by Letters Patent is:

1. Process for the production of silicone elastomers that comprises, admixing a di-cumyl peroxide curing catalyst with a silicone composition selected from the group consisting of siloxane copolymers and mixtures of siloxane polymers having a combined siloxane composition as represented by the unit structural formula:

$$-[NC(CH_2)_aSiRO]_x \cdot [R'_2SiO]_y-$$

wherein $x$ and $y$ represent the weight-percentages of the respective components within the combined siloxane system, with $x$ being equal to a value within the range 0.1 to 2.0 and the sum of $x+y$ being equal to 100; $a$ has a value from 2 to 5, inclusive; R represents a monovalent hydrocarbon radical selected from the group consisting of methyl, ethyl and phenyl radicals; and R' represents at least one monovalent hydrocarbon radical selected from the group consisting of methyl, ethyl and phenyl radicals; and subjecting the mixture to heat-curing at an elevated temperature to cause the di-cumyl peroxide and silicone composition to react with the production of a crosslinked silicone elastomer consisting essentially of crosslinkages effected through the cyanoalkyl substituents of said silicone composition in the form of (1) Si-dinitrile-Si and (2) Si-secondary nitrile-Si linkages.

2. Process for the production of silicone elastomers that comprises, admixing a di-cumyl peroxide curing catalyst with a silicone composition selected from the group consisting of siloxane copolymers represented by the unit structural formula:

$$-[NC(CH_2)_aSiRO]_x \cdot [R'_2SiO]_y-$$

wherein $x$ and $y$ represent the weight-percentages of the respective components within the combined siloxane system, with $x$ being equal to a value within the range 0.1 to 2.0 and the sum of $x+y$ being equal to 100; $a$ has a value from 2 to 5, inclusive; R represents a monovalent hydrocarbon radical selected from the group consisting of methyl, ethyl and phenyl radicals; and R' represents at least one monovalent hydrocarbon radical selected from the group consisting of methyl, ethyl and phenyl radicals; and subjecting the mixture to heat-curing at an elevated temperature to cause the di-cumyl peroxide and silicone composition to react with the production of a crosslinked silicone elastomer consisting essentially of crosslinkages effected through the cyanoalkyl substituents of said silicone composition in the form of (1) Si-dinitrile-Si and (2) Si-secondary nitrile-Si linkages.

3. Process for the production of silicone elastomers that comprises, admixing a di-cumyl peroxide curing catalyst with a silicone composition selected from the group consisting of mixtures of siloxane polymers having a combined siloxane composition as represented by the unit structural formula:

$$-[NC(CH_2)_aSiRO]_x \cdot [R'_2SiO]_y-$$

wherein $x$ and $y$ represent the weight-percentages of the respective components within the combined siloxane system, with $x$ being equal to a value within the range 0.1 to 2.0 and the sum of $x+y$ being equal to 100; $a$ has a value from 2 to 5, inclusive; R represents a monovalent hydrocarbon radical selected from the group consisting of methyl, ethyl and phenyl radicals; and R' represents at least one monovalent hydrocarbon radical selected from the group consisting of methyl, ethyl and phenyl radicals; and subjecting the mixture to heat-curing at an elevated temperature to cause the di-cumyl peroxide and silicone composition to react with the production of a crosslinked silicone elastomer consisting essentially of crosslinkages effected through the cyanoalkyl substituents of said silicone composition in the form of (1) Si-dinitrile-Si and (2) Si-secondary nitrile-Si linkages.

4. Process for the production of silicone elastomers that comprises, admixing a filler material selected from the group consisting of basic and neutral filler materials, and a di-cumyl peroxide curing catalyst with a silicone composition selected from the group consisting of siloxane copolymers and mixtures of siloxane polymers having a combined siloxane composition as represented by the unit structural formula:

$$-[NC(CH_2)_aSiRO]_x \cdot [R'_2SiO]_y-$$

wherein $x$ and $y$ represent the weight-percentages of the respective components within the combined siloxane system, with $x$ being equal to a value within the range 0.1 to 2.0 and the sum of $x+y$ being equal to 100; $a$ has a value from 2 to 5, inclusive; R represents a monovalent hydrocarbon radical selected from the group consisting of methyl, ethyl and phenyl radicals; and R' represents at least one monovalent hydrocarbon radical selected from the group consisting of methyl, ethyl and phenyl radicals; and subjecting the mixture to heat-curing at an elevated temperature to cause the di-cumyl peroxide and silicone composition to react with the production of a crosslinked silicone elastomer consisting essentially of crosslinkages effected through the cyanoalkyl substituents of said silicone composition in the form of (1) Si-dinitrile-Si and (2) Si-secondary nitrile-Si linkages.

5. The process as claimed in claim 4, wherein said filler consists of a neutral composition containing the acidic filler silica in admixture with a basic filler material selected from the group consisting of iron oxide and zinc oxide.

6. The process as claimed in claim 4, wherein said filler consists of a basic carbon black material.

7. Process for the production of silicone elastomers that comprises, admixing a filler selected from the group consisting of basic and neutral filler materials, and a di-cumyl peroxide curing catalyst with a gamma-cyanopropylmethylsiloxy-modified dimethyl silicone gum stock containing from 0.1 to 2.0 percent by weight gamma-cyanopropylmethylsiloxy units, and subjecting the mixture to heat-curing at an elevated temperature to cause the di-cumyl peroxide and gum stock to react with the production of a crosslinked silicone elastomer consisting essentially of crosslinkages effected through the cyanopropyl substituents of said silicone gum stock in the form of (1) Si-dinitrile-Si and (2) Si-secondary nitrile-Si linkages.

8. A heat-cured, filled dimethyl silicone elastomer produced from a cyanoalkylsiloxy-modified dimethyl silicone gum stock containing from 0.1 to 2.0 percent by weight of cyanoalkylmethylsiloxy units of the formula $$[NC(CH_2)_aSi(CH_3)O]$$

wherein $a$ has a value of from 2 to 5, by selectively heat-curing said gum stock in the presence of di-cumyl peroxide to effect crosslinkages through the cyanoalkyl substituents said crosslinkages consisting essentially of (1) Si-dinitrile-Si and (2) Si-secondary nitrile-Si linkages.

9. A heat-cured, filled dimethyl silicone elastomer produced from a gamma-cyanopropylmethylsiloxy-modified dimethyl silicone gum stock containing from 0.1 to 2.0 percent by weight of gamma-cyanopropylmethylsiloxy units by selectively heat-curing said gum stock in the presence of di-cumyl peroxide to effect crosslinkages through the cyanopropyl substituents, said crosslinkages consisting essentially of (1) Si-dinitrile-Si and (2) Si-secondary nitrile-Si linkages.

References Cited in the file of this patent

UNITED STATES PATENTS 2,816,089    Willis _____ Dec. 10, 1957

FOREIGN PATENTS 1,116,725    France _____ Feb. 6, 1956